United States Patent [19]

Suzuki et al.

[11] Patent Number: 5,691,424
[45] Date of Patent: Nov. 25, 1997

[54] HEAT-RESISTANT MOLDED ARTICLE OF LACTIC ACID-BASE POLYMER

[75] Inventors: Kazuhiko Suzuki; Takayuki Watanabe; Yasuhiro Kitahara; Masanobu Ajioka, all of Kanagawa-ken, Japan

[73] Assignee: Mitsui Toatsu Chemicals, Inc., Tokyo, Japan

[21] Appl. No.: 450,927

[22] Filed: May 25, 1995

[51] Int. Cl.$^6$ .................................................. C08L 67/04
[52] U.S. Cl. .................. 525/411; 264/331.21; 264/349; 525/413; 525/415; 528/354; 528/361
[58] Field of Search ................... 525/415, 411, 525/413; 524/306, 310; 264/331.21, 349; 528/354, 361

[56] References Cited

U.S. PATENT DOCUMENTS

| | | | |
|---|---|---|---|
| 4,444,927 | 4/1984 | Borysko | 264/331.21 |
| 4,839,130 | 6/1989 | Kaplan et al. | 264/331.21 |
| 5,409,751 | 4/1995 | Suzuki et al. | 264/331.21 |
| 5,502,158 | 3/1996 | Sinclair et al. | 524/306 |

FOREIGN PATENT DOCUMENTS

| | | |
|---|---|---|
| 401844 | 12/1990 | European Pat. Off. . |
| 507554 | 10/1992 | European Pat. Off. . |
| 3635679 | 5/1988 | Germany . |

OTHER PUBLICATIONS

Database WPI, Derwent Publications Ltd., London GB; AN 94–037921(059) XP002010135 & JP–A–05342903 (Mitsui Toatsu Chemicals, Inc.), Dec. 24, 1993, *Abstract*.
Database WPI, Derwent Publications, Ltd., London, GB; AN 93–137113(17) XP002010136 & JP–A–05070696 (Toppan Printing Co., Ltd.), Mar. 23, 1993 *Abstract*.

*Primary Examiner*—Mathieu D. Vargot
*Attorney, Agent, or Firm*—Burns, Doane, Swecker & Mathis

[57] ABSTRACT

A preparation process of heat-resistant molded articles of a lactic acid-based polymer comprising mixing the lactic acid-based polymer and poly-ε-caprolactone so as to obtain a L-lactic acid ratio of 75% by weight or more, adding to the polymer mixture a crystalline inorganic powder containing 50% by weight or more of $SiO_2$, melt-kneading the resultant composition, filling the same into a mold which is set at 85°~125° C. and forming a shape while promoting crystallization. The molded articles have excellent heat resistance and impact strength, are suitably used for food trays and beverage cups, and can be degraded, in the case of waste, into nontoxic water and carbon dioxide like natural products within a relatively short period in the natural environment.

11 Claims, No Drawings

HEAT-RESISTANT MOLDED ARTICLE OF LACTIC ACID-BASE POLYMER

BACKGROUND OF THE INVENTION

1. Field of the Invention

The present invention relates to a heat-resistant molded article of lactic acid-based polymer which has excellent heat resistance and impact strength and can be degraded after use in the natural environment.

2. Description of the Related Art

Resins such as polypropylene and crystalline polyethylene terephthalate (hereinafter referred to simply as PET) have been generally used as a raw material of containers having excellent heat resistance and impact strength. PET has a slow rate of crystallization and requires a long time for completing a molding cycle. Accordingly, a mold temperature is increased or a crystallization nucleating agent is added for overcoming the problem. However, molded products prepared from these resins increase the amount of scrap on disposal, although excellent in heat resistance. Additionally, these resins scarcely degrade in the natural environment and semi-permanently remain under the ground even in the case of burial disposal. Further, abandoned plastics have led to problems of impairing a grand view and destructing the living environment of marine organisms.

On the other hand, polylactic acid and a copolymer of lactic acid with other hydroxycarboxylic acid (hereinafter referred to simply as lactic acid-based polymer) have been developed as polymers which are thermoplastic and biodegradable. These polymers can be completely biodegraded in an animal body within a few months to a year. In the case of being left in soil or sea water, the polymers start to degrade within a few weeks and disappear in one to several years. Further, these polymers have a characteristic that decomposition products are lactic acid, carbon dioxide and water which are non-toxic to the human body.

Lactic acid which is a raw material of lactic acid-base polymer has been prepared by a fermentation process or chemical synthesis. L-lactic acid, in particular, is manufactured in a large scale with drop in price and also has a feature of providing high stiffness for the resulting polymer. Consequently, it is now expected to utilize various polymers having a high content of L-lactic acid.

Containers prepared by injection molding of lactic acid-based polymers have excellent stiffness. However, heat resistance of these polymers is low, or both heat resistance and impact resistance are low.

For example, hot water or a microwave oven cannot be used for the packaging containers prepared from these polymers. Thus, the field of use is restricted. It has been required for improving heat resistance to increase crystallinity by extending the mold cooling time in the processing step or by annealing the molded articles. However, the mold cooling for a long time is not practical and tends to provide insufficient crystallization. Post crystallization by annealing is liable to develop deformation of molded articles in the course of crystallization.

As to the process for increasing the rate of crystallization, addition of a nucleating agent has been known to accelerate crystallization. For example, Japanese Laid-Open Patent SHO 60-86156 has disclosed in addition as a crystallization nucleating agent fine powder of the whole aromatic polyester comprising terephthalic acid and resorcinol as main constitutional units.

On the other hand, patents for adding nucleating agents to biodegradable polymers include, for example, Japanese Laid-Open Patent HEI 5-70696, Tokkyo Kohkai Kohyo HEI 4-504731, U.S. Pat. No. 5,180,765, Tokkyo Kohkai Kohyo HEI 6-504799, and Japanese Laid-Open Patent HEI 4-220456. Japanese Laid-Open Publication HEI 5-70696 has disclosed that 10~40% by weight of calcium carbonate or hydrated magnesium silicate (talc) having an average particle size of 20 μm or less is added to biodegradable plastics such as 3-hydroxybutyrate/3-hydroxyvalerate copolymer, polycaprolactone and polylactic acid in order to prepare a raw material of plastic containers. The object of this technique is to accelerate decomposition of the degradable plastics after waste-disposal by addition of a large amount of inorganic fillers, and in addition is not intended to improve heat resistance of polymer by increasing crystallinity.

Tokkyo Kohkai Kohyo HEI 4-504731 (WO 90/01521) has described that properties such as hardness, strength and temperature resistance can be varied by addition of inorganic fillers such as silica and kaolinite to thermoplastics from lactide, and that, in the example, a L, DL-lactide copolymer was blended with 5% by weight of calcium lactate as a nucleating agent by kneading on hot rolls at 170° C. and the resulting sheet exhibited increased stiffness and strength and was hazy as a result of crystallinity increase.

Tokkyo Kohkai Kohyo HEI 4-504799 (WO 92/04413) has described lactic acid salts and benzoic acid salts for use in a nucleating agent disclosed in the example that a copolymer of lactide was blended with 1% of calcium lactate and injection molded into a mold maintained at 85° C. with a residence time of 2 minutes, resulted in insufficient crystallization, and thus was further annealed in the mold at 110°~135° C.

In practice, a lactic acid-based polymer has been blended with a nucleating agent such as commonly used talc, silica, calcium lactate and sodium benzoate and injection and injection molded. However, practically useful articles could not be molded because of a slow rate of crystallization and brittleness of the molded articles.

Consequently, even though these lactic acid-based polymers are subjected to common injection molding blow-forming or compression molding in the presence of talc or silica, uses of the molded articles obtained are restricted because crystallization speed is slow, the resulting molded articles have an actual heat resistance of 100° C. or less, and impact strength is not so high.

Japanese Laid-Open Patent HEI 4-220456 has disclosed that addition of polyglycolic acid or derivatives thereof as a nucleating agent to poly-L-lactide can increase crystallization temperature, reduce the injection cycle time, and provide excellent mechanical properties for the molded articles. It has been exemplified that in the case of injection molding, the crystallinity obtained after cooling for 60 seconds is 22.6% in the absence of a nucleating agent and 45.5% in the presence of a nucleating agent.

Injection molding of a lactic acid-based polymer was practically tried without a nucleating agent. However, injection molding could not be carried out at the mold temperature above Tg of the polymer, that is, under such conditions as described in Japanese Laid-Open Patent HEI 4-220456.

SUMMARY OF THE INVENTION

The object of the invention is to provide a molded article of a lactic acid-based polymer having excellent heat resistance and impact strength.

As a result of an intensive investigation in order to achieve the above object, the present inventors have completed the invention.

One aspect of the present invention is a process for preparing a heat-resistant molded article of a lactic acid-based polymer comprising mixing 75~95% by weight of a lactic acid-based polymer with 5~25% by weight of poly-ε-caprolactone so as to obtain an L-lactic acid ratio of 75% by weight or more, adding 0.1~15 parts by weight of a crystalline inorganic powder comprising 50% by weight or more of $SiO_2$ to 100 parts by weight of said polymer mixture, melt-kneading the resultant composition, filling the same into a mold of a molding machine at a mold temperature of 85°~125° C., and forming a shape while promoting crystallization.

Another aspect of the present invention is a process for preparing a heat-resistant molded article of a lactic acid-based polymer comprising mixing 100 parts by weight of a lactic acid-based polymer having an L-lactic acid ratio of 75% by weight or more, 0.1~15 parts by weight of a crystalline inorganic powder comprising 50% by weight or more of $SiO_2$ and 1~30 parts by weight of a polyester and is obtained by condensation of an aliphatic polyhydric alcohol with an aliphatic polybasic acid or with an aliphatic polybasic acid and a hydroxycarboxylic acid, melt-kneading the resultant composition, filling the same into a mold of a molding machine at a mold temperature of 85°~125° C., and forming a shape while promoting crystallization.

A further aspect of the present invention is a process for preparing a heat-resistant molded article of a lactic acid-based polymer comprising mixing 75~95% by weight of a lactic acid-based polymer with 5~25% by weight of poly-ε-caprolactone so as to obtain an L-lactic acid ratio of 75% by weight or more, adding, to 100 parts by weight of the resultant mixture, 0.1~10 parts by weight of a crystalline inorganic powder comprising 50% by weight or more of $SiO_2$ and 1~30 parts by weight of a polyester which has a weight average molecular weight of 80,000~300,000 and is obtained by condensation of an aliphatic polyhydric alcohol with an aliphatic polybasic acid or with an aliphatic polybasic acid and a hydroxycarboxylic acid, melt-kneading the resultant composition, filling the same into a mold of a molding machine at a mold temperature of 85°~125° C., and forming a shape while promoting crystallization.

The molded articles of the lactic acid-based polymer obtained in the invention have excellent heat resistance and impact strength and are suitably used for a raw material of heat resistant food trays for use in microwave ovens and beverage cups. Further, when buried underground as waste or abandoned in the sea or river, these articles are degraded in the natural environment within a relatively short period into nontoxic water and carbon dioxide like natural products such as wood and paper.

DETAILED DESCRIPTION OF PREFERRED EMBODIMENTS

The term "lactic acid-based polymer" in the invention refers to polylactic acid, a lactic acid/hydroxycarboxylic acid copolymer and a mixture thereof which have an L-lactic acid proportion of 75% by weight or more in the polymer.

Lactic acid and hydroxycarboxylic acid are used as raw materials of the polymer. Lactic acid which can be used is L-lactic acid, D-lactic acid, DL-lactic acid, a mixture thereof and lactide which is the cyclic dimer of lactic acid. These kinds of lactic acids can be used in various combinations so as to obtain an L-lactic acid proportion of 75% by weight or more in the lactic acid-based polymer.

Exemplary hydroxycarboxylic acid which can be used in combination with these kinds of lactic acid include glycolic acid, 3-hydroxybutyric acid, 4-hydroxybutyric acid, 4-hydroxyvaleric acid, 5-hydroxyvaleric acid and 6-hydroxycaproic acid. Cyclic dimers of hydroxycarboxylic acids, for example, glycolide which is a dimer of glycolic acid or a cyclic ester intermediate such as ε-caprolactone can also be used.

The lactic acid-based polymer which can be used in the invention is prepared from lactic acid having a L-lactic acid content of 75% by weight or more or a lactic acid/hydroxycarboxylic acid mixture having an L-lactic acid content of 75% by weight or more by direct dehydration polycondensation or by ring-opening polymerization of lactide which is a cyclic dimer of the above lactic acid, or a cyclic of hydroxycarboxylic acid, e.g., glycolide which is a dimer of glycolic acid or a cyclic ester intermediate such as ε-caprolactone.

In the case of preparing by direct dehydration polycondensation, a high molecular weight lactic acid-based polymer having a suitable strength for the invention can be prepared by carrying out an azeotropic dehydration condensation of the raw material that is, lactic acid or a mixture of lactic acid and hydroxycarboxylic acid preferably in the presence of an organic solvent, a diphenyl ether-based solvent in particular, more preferably in the presence of a solvent recycle system where water is removed from the distilled solvent and the dehydrated solvent is returned to the reaction system.

The weight average molecular weight of the lactic acid-based polymer is preferably as high as possible in the range capable of being molded. A molecular weight of 30,000 or more is more preferred. When the weight average molecular weight of the polymer is less than 30,000, molded articles decrease in mechanical strength and become unsuitable for practical use. A polymer having an weight average molecular weight of 1,000,000 or more can also be used for the preparation of molded articles of the invention by designing the molding ability of the polymer composition. The weight average molecular weight exceeding 5,000,000 is liable to make processability poor.

A specific agent serving as a nucleus of crystallization (hereinafter referred to simply as a nucleating agent) is used in the invention in order to promote crystallization of the lactic acid-based polymer. The nucleating agent acts as a heterogeneous nucleus of crystallization, reduces a surface free energy of the polymer accompanied by nucleus formation, and thus accelerates crystallization.

As a result, the polymer can more rapidly attain a certain crystallization speed in the processing step and thus the molded articles obtained are expected to have improved heat resistance.

Commonly used nucleating agents are not always useful for the invention. General purpose nucleating agents cannot so much increase the crystallization speed of the lactic acid-based polymer and cannot accomplish the object.

Nucleating agents which are suitable for crystallizing the lactic acid-based polymer are crystalline inorganic powder, more preferably crystalline powder containing 50% by weight or more of $SiO_2$ component and having hydroxyl groups. When the above nucleating agents contain less than 50% by weight of the $SiO_2$ component, or when the nucleating agents are amorphous even though in the presence of 50% by weight or more of the $SiO_2$ component, the polymer has a low crystallization speed and is unsuitable for practical use. Low crystallization speed can also by seen by low heat of crystallization in the temperature lowering of a differential scanning colorimetry (hereinafter referred to simply as DSC) of the molded articles.

No particular restriction is imposed upon the pH of an aqueous nucleating agent solution. However, the pH is preferably 8.5 or less, more preferably 4~8 in order to prevent strength reduction due to molecular weight decrease in the lactic acid-based polymer. In practice, particularly preferred nucleating agents are talc having 50% by weight or more of the crystalline $SiO_2$ component and pH of 8.5 or less, and kaolin having 50% by weight or more of crystalline $SiO_2$ component and pH of 8.5 or less.

The amount used is 0.1~15 parts by weight, preferably 0.5~7 parts by weight for 100 parts by weight of the lactic acid-based polymer.

When the amount is less than 0.1 part by weight, the effect of the nucleating agent cannot be exhibited. On the other hand, an amount exceeding 15 parts by weight is liable to decrease the molecular weight of the lactic acid-based polymer and results in giving an adverse effect on the properties of the polymer.

When a polymer-based dispersant is used, the amount of the nucleating agent is more preferably 0.1~15 parts by weight, most preferably 0.5~7 parts by weight for 100 parts by weight of the sum of the lactic acid-based polymer and dispersant. In the absence of the dispersant, the amount of the nucleating agent is more preferably 0.1~15 parts by weight, most preferably 0.5~7 parts by weight for 100 parts by weight of the lactic acid-based polymer.

In order to crystallize the lactic acid-based polymer, a polymer-based dispersant, polymer-based processability improver and crystallization accelerator can be added in addition to the nucleating agent.

When a polymer-based dispersant is used on crystallizing the composition of the lactic acid-based polymer and nucleating agent in the invention, the dispersion of the nucleating agent in the lactic acid-based polymer is improved and crystallization speed is accelerated, and hence, molded articles having uniformly excellent heat resistance and impact strength can be provided. Preferred dispersants are poly-ε-caprolactone and styrene-butadiene-based thermoplastic elastomers.

Poly-ε-caprolactone which can be used has a weight average molecular weight of preferably 50,000~250,000, more preferably 100,000~150,000. Higher molecular weight dispersant can be used so long as the dispersant can be uniformly mixed with the lactic acid based polymer, When poly-ε-caprolactone is used, impact strength is also improved in addition to the dispersing effect.

Styrene-butadiene-based thermoplastic elastomer is a block copolymer obtained by using polystyrene as a hard segment and polybutadiene as a soft segment. The composition has a styrene/butadiene weight ratio of preferably in the range of 20/80~45/55, more preferably in the range of 30/70~40/60.

The mixture of the lactic acid-based polymer and dispersant can provide preferable crystallinity when the proportion of L-lactic acid is 75% by weight or more for the total amount of the mixture. When the proportion of L-lactic acid is less than 75% by weight, crystallinity becomes poor and molded articles having desired heat resistance are obtained.

When the dispersant is used, the amount is preferably 5~25% by weight, more preferably 10~20% by weight for the lactic acid-based polymer. An amount exceeding 25% by weight decreases the strength of the molded articles or leads to poor processability and makes practical use difficult. On the other hand, an amount less than 5% by weight results in insufficient effect of addition.

A polymer-based processability improver can be used for accelerating crystallization in the invention. The processability improver remarkably accelerates crystallization speed of the lactic acid-based polymer and molded articles can be obtained with an equivalent molding cycle to a general purpose resin, for example, polypropylene resin.

The processability improver of the invention exemplifies polyester derived from an aliphatic polyhydric alcohol and an aliphatic polybasic acid or polyester derived from an aliphatic polyhydric alcohol, an aliphatic polybasic acid and an hydroxycarboxylic acid. The processability improver has a weight average molecular weight of 10,000~ 1,000,000, preferably 50,000~500,000 and more preferably 80,000~300,000. These polyesters also include those obtained by extending the polymer chain with a diisocyanate compound.

When the processability improver is used, the amount is preferably 1~20 parts by weight, more preferably 5~15 parts by weight for 100 parts by weight of the lactic acid-based polymer, or in the case of using the dispersant, for 100 parts by weight of the sum of the lactic acid-base acid-based polymer and the dispersant. An amount of the processability improver exceeding 20 parts by weight leads to inferior stiffness of the molded articles and these articles are unsuitable for practical use. On the other hand, an amount less than 5% by weight results in an unsatisfactory effect.

No particular restriction is imposed upon the aliphatic polyhydric alcohol. Aliphatic polyhydric alcohols which can be used include, for example, 1, 4-butanediol and ethylene glycol. Aliphatic polybasic acids are not limited in particular and are exemplified by succinic acid and adipic acid. No particular limitation is put upon the hydroxycarboxylic acid. Exemplary hydroxycarboxylic acids include lactic acid. Diisocyanate compounds are not particularly restricted and include hexamethylene diisocyanate.

A crystallization accelerator can be used in the invention in order to accelerate crystallization, when needed.

Use of the crystallization accelerator in combination with the nucleating agent can accelerate crystallization speed of the lactic acid-based polymer. As a result, the molding cycle time is reduced and molded articles of the heat-resistant lactic acid-based polymer have excellent heat resistance and impact strength.

Preferred crystallization accelerators in the invention include diisodecyl adipate, n-octyl-n-decyl adipate and other aliphatic dibasic acid esters; glycerol triacetate and other polyhydric alcohol esters; and tributyl acetylcitrate and other tributyl hydroxypolycarboxylates. When the crystallization accelerator is used in the invention, the amount is preferably 0.1~8 parts by weight, more preferably 1~5 parts by weight for 100 parts by weight of the lactic acid-based polymer, or, in the case of using the dispersant, for 100 parts by weight of the sum of the lactic acid based-polymer and the dispersant.

An amount of the crystallization accelerator less than 0.1 part by weight makes the effect of addition insufficient, whereas an amount exceeding 8 parts by weight gives unfavorable effects on the physical properties of the molded articles.

The composition of the invention comprising the lactic acid-based polymer, nucleating agent and when needed, the dispersant, processability improver and crystallization accelerator (hereinafter referred to simply as a lactic acid-based polymer composition) can be incorporated with other various modifiers depending upon the object for use of the molded articles. Exemplary modifiers include stabilizers and ultraviolet absorbers.

Mixing of the lactic acid-based polymer compositions can be carried out by using usual mixing and kneading methods.

Crystallization of the lactic acid-based polymer composition can be carried out by setting the mold temperature at the crystallization temperature of the polymer and maintaining the mold temperature for a given time in the molding stage, or by annealing the molded articles at the crystallization temperature.

The method for maintaining the molded articles at the crystallization temperature for a given time in the molding stage is carried out by setting the mold temperature of an injection molding machine, blow molding machine or compression molding machine between the initiation and finishing temperature of crystallization in the temperature lowering of DSC and by crystallizing the composition of the invention in the mold. The heat-resistant molded articles of the lactic acid-based polymer having excellent heat-resistance and impact strength can be obtained by this method.

Mold temperature is generally 85°~125° C., preferably 90°~115° C., more preferably 100°~110° C. Within the temperature range, mold articles can crystallize with ease and high dimensional accuracy can be obtained as a result of sufficient solidification in the stage of removing the molded articles from the mold. Outside of the temperature range, the crystallization speed decreases and solidification time of the molded articles is extended and thus practical utility becomes inferior.

The lactic acid-based polymer composition of the invention can be prepared by mixing with known mixing techniques such as a Henschel mixer and ribbon blender or further by melt-kneading with an extruder. The lactic acid-based polymer composition can be used for molding in any form of pellet, bar, powder and granule.

Next, the process for preparing molded articles from the lactic acid-based polymer composition of the invention will be illustrated in detail.

The process for preparing molded articles of the lactic acid-based polymer is carried out by uniformly mixing the lactic acid-based polymer composition with a blender and successively undergoing injection molding, blow-molding or compression molding.

In order to prepare molded articles having excellent heat resistance, a mold temperature for injection molding is set generally at 85°~125° C., preferably at 95°~110° C., that is, a temperature range between initiation and finishing temperature of crystallization in the temperature lowering of DSC. The lactic acid-based polymer composition is generally melted at 180°~250° C. in the cylinder of a molding machine, filled into the mold, crystallized and moved as the molded article from the mold. For example, a mixture comprising 100 parts by weight of the lactic acid-based polymer and 1 part by weight of prescribed talc has a crystallization initiation temperature of 120° C. and crystallization finishing temperature of 95° C. in the temperature lowering. A mixture comprising 100 parts by weight of the polymer, 3 parts by weight of prescribed talc and 5 parts by weight of DIDA has a crystallization initiation temperature of 114° C. and crystallization finishing temperature of 90° C. in the temperature lowering. Mold temperature setting in the above crystallization range is effective for improving heat resistance of the molded articles. In the case of blow molding, a parison is delivered from a die which is mounted on an extruder head, inserted into a mold which was previously set in the above temperature range, blown with the air and successively crystallized. In the case of compression molding, the temperature of the mold was previously set at 180°~250° C., the polymer composition is charged into mold, pressure is applied to the mold, and the mold is successively cooled to the above temperature range to promote crystallization. Cooling time differs depending upon molding method, and shape and thickness of the molded articles, and is generally in the range of 10~100 seconds.

Heat resistance in the invention is shown by a Vicat softening point in accordance with ASTM-D1525. A needle is vertically placed on a sample under load of 1 kg. Temperature is increased at a constant rate.

The temperature when the needle penetrates 1 mm into the sample is defined as the softening point. The Vicat softening point of heat-resistant molded articles obtained from the lactic acid-based polymer of the invention differs depending upon the amount of the nucleating agent, dispersant, processability improver and crystallization accelerator. The softening point is generally 100°~160° C. in view of heat resistance for a microwave oven and practical utility, preferably 120°~160° C., more preferably 130°~150° C., most preferably 140°~150° C. Molded articles of the lactic acid-based polymer have a Vicat softening point almost corresponding to the heat resistant temperature defined in accordance with JIS-S 2033. Method for Testing Plastic Containers used in a Microwave Oven, which is a specification indicating heat resistance. A molded container of the lactic acid-based polymer having a Vicat softening point of 149° C. was maintained at 150° C. for an hour in the air in a constant temperature oven equipped with a stirrer. After allowing to cool to the room temperature, no abnormality such as deformation was observed on the container.

According to the present invention, excellently heat-resistant containers and other molded articles can be efficiently prepared from the lactic acid-based polymer with a common molding machine used for molding polystyrene and other general purpose resins. The molded products are applied to various uses such as everyday items and miscellaneous goods, particularly containers for use in a microwave oven.

EXAMPLE

The present invention will now be illustrated in detail by way of examples and comparative examples.

In these examples, part means part by weight.

A weight average molecular weight of polymer was measured by gel permeation chromatography using polystyrene as a reference under the following conditions.

Equipment: Shimadzu LC-10AD
Detector: Shimadzu RID-6A
Column: Hitachi chemical S-350DT-5, S-370DT-5
Solvent: Chloroform
Concentration: 1%
Pour Volume: 20 μl
Flow rate: 1.0 ml/min Preparation Example 1

Into a thick-walled cylindrical stainless steel polymerization reactor equipped with a stirrer, 100 parts of L-lactide, 0.01 parts of stannous octoate and 0.03 part of lauryl alcohol were sealed, deaerated under vacuum for 2 hours and successively replaced by nitrogen gas. The mixture was heated at 200° C. for 3 hours with stirring in a nitrogen atmosphere. While maintaining the same temperature, the reaction vessel was gradually deaerated with a vacuum pump by way of an outlet tube and a glass receiver to a reduced pressure of 3 mm Hg. After an hour from starting deaeration, distillation of the monomer and low molecular weight volatile ingredients ceased. The reaction vessel was replaced by nitrogen. The reaction product was discharged in the form of a strand from the bottom of the reaction vessel and cut into pellets to obtain lactic acid-based polymer A having a L-lactic acid ratio of 100%. The polymer had a weight average molecular weight Mw about 100,000 and Tg of 59° C.

Preparation Example 2

In a 100 l reaction vessel equipped with a Dean Stark trap, 10 kg of 90% purity L-lactic acid (L-lactic acid ratio 100%) was stirred at 150° C. for 3 hours under reduced pressure of 50 mm Hg while distilling out water, successively 6.2 g of tin powder was added, and stirring was continued at 150° C. for 2 hours under reduced pressure of 30 mm Hg to obtain an oligomer. The oligomer was sized with 28.8 g of tin powder and 21.1 kg of diphenyl ether. An azeotropic dehydration reaction was conducted on the mixture at 150° C. under reduced pressure of 35 mm Hg while separating distilled water and the solvent in the water separator and returning the solvent alone to the reaction vessel. After two hours, configuration of the equipment was changed so as to return the organic solvent to the reaction vessel after passing through a column packed with 4.6 kg of molecular sieve 3A. The reaction was further continued at 150° C. for 40 hours under reduced pressure of 35 mm Hg to obtain a solution of polylactic acid having an average molecular weight of 110,000. The solution was mixed with 44 kg of dehydrated diphenyl ether and cooled to 40° C. Precipitated crystals were filtered, washed 3 times with 10 kg each of n-hexane and dried at 60° C. under reduced pressure of 50 mm Hg. The powder thus obtained was mixed with 12 kg of 0.5 N-hydrochloric acid and 12 kg of ethanol. The mixture was stirred at 35° C. for an hour, filtered and dried at 60° C. under reduced pressure of 50 mm Hg to obtain 6.1 kg (85% yield) of polylactic acid powder.

The powder was pelletized by melting in an extruder to obtain lactic acid polymer B having a L-lactic acid ratio of 100%. Polymer B had a weight average molecular weight of 110,000 and Tg of 59° C.

Preparation Example 3

Pellets of DL-lactic acid polymer C having as L-lactic acid ratio of 50% were obtained by carrying out the same procedures as described in Preparation Example 2 except that 100 parts of L-lactic acid was replaced by 100 parts of DL-lactic acid. The polymer had a weight average molecular weight of 110,000 and Tg of 50° C.

Preparation Example 4

The same procedures as described in Preparation Example 2 were carried out except that 100 parts of L-lactic acid was replaced by 80 parts of L-lactic acid and 20 parts of glycolic acid as a hydroxycarboxylic acid component. Pellets of lactic acid/hydroxycarboxylic acid copolymer D having a L-lactic acid ratio of 80% by weight was prepared. The polymer had a weight average molecular weight of 100,000 and Tg of 49° C.

[Preparation of processability improver]

Preparation Example 5

To a mixture of 50.5 g of 1,4-butanediol and 66.5 g of succinic acid, 293.0 g of diphenyl ether and 2.02 g of metallic tin were added and heated with stirring at 130° C. for 7 hours under reduced pressure of 140 mm Hg to obtain an oligomer. Thereafter a Dean Stark trap was mounted on the reaction vessel and azeotropic dehydration was carried out at 140° C. for 8 hours under reduced pressure of 30 mm Hg. In the next step, a tube packed with 40 g of molecular sieve 3A was fitted so as to return the distilled solvent to the reaction vessel by way of a molecular sieve layer and the reaction mixture was further stirred at 130° C. for 49 hours under reduced pressure of 17 mm Hg. The reaction mass was dissolved in 600 ml of chloroform and poured into 4 liters of acetone. The reprecipitated product was sludged 3 times for 0.5 hour each with an isopropanol (IPA) solution of hydrochloric acid having a HCl content of 0.7 wt % washed with IPA and dried at 60° C. for 6 hours under reduced pressure to obtain polybutylene succinate (PSB). The polymer had a weight average molecular weight of 118,000.

Preparation Example 6

To 18.9 g ethylene glycol and 34.25 g of succinic acid, 0.210 g of metallic tin was added and the mixture was heated with stirring while distilling water out of the reaction system by ventilating nitrogen at a flow rate of 0.5/min. The temperature was increased from the room temperature to 150° C. over an hour under 1 atmosphere. The reaction was continued for 6 hours under the same conditions. Successively a Dean Stark Trap was mounted on the vessel. 155 g of diphenyl ether was added, and an azeotropic reaction was carried out at 150° C. for 8 hours under reduced pressure of 38 mm Hg while removing generated water. Thereafter the Dean Stark Trap was replaced by a tube packed with 20 g of molecular sieve 5A so as to return distilled water to the reaction system after passing through the molecular sieve. The reaction was further continued at 130° C. for 34 hours. Before finishing the reaction, a small amount of sample was taken out at the outlet of the molecular sieve packed tube and analyzed. The returning solvent had a water content of less than 5 ppm and an ethylene glycol content of less than a detection limit 10 ppm.

The reaction mass was dissolved in 500 ml of chloroform and poured into 5.8 liters of acetone. The reprecipitated product was dried at 60° C. for 6 hours under reduced pressure to obtain polyethylene succinate (PSB). The polymer had a weight average molecular weight of 139,000.

Next the process for preparing formed articles of L-lactic acid-based polymer of the invention by using lactic acid-based polymers obtained in the Preparation Examples 1~4 will be illustrated by the example hereinafter.

Physical properties were measured by the following conditions 1) crystallization temperature at DSC temperature lowering A differential scanning calorimeter DSC-50 (manufactured by Shimadzu Seisakusho Co.) was used.

After heating 5 mg of a pellet sample to 200° C. at a temperature increase rate of 10° C./min, the sample was maintained at 200° C. for 5 minutes and crystallization temperature was measured at a temperature lowering rate of 5° C./min.

2) Crystallinity

An X-ray diffractometer Rint 1500 (manufactured by Rigaku Denki Co.) was used and molded specimens were measured.

3) Heat resistance

Vicat softening temperature was measured on molded specimens under load of 1 kgf in accordance with ASTM-D1525.

4) Impact strength

Izod impact strength was measured by using a notched specimen in accordance with ASTM-D256.

4) Degradability

A specimen having dimensions of 2×5 cm was buried in soil at 35° C. under moisture content 30%. Change of appearance and weight loss of the specimen were inspected.

Examples 1–5

[Use of dispersant]

The lactic acid-based polymers A–D obtained in Preparation Examples 1–4, poly-ε-caprolactone dispersant P-787 (Trade Mark of TONE hereinafter referred to simply PCL), or styrene butadiene based thermoplastic elastomer dispersant TUFPRENE A (Trade Mark of Asahi Chemical Co., hereinafter referred to simply as SB), talc (manufactured by Fuji Talc Co., $SiO_2$ content 60%, crystalline product) as a nucleating agent, and diisodecyl adipate (hereinafter referred to simply as DIDA) and tributyl acetyl citrate (hereinafter referred to simply as ATBC) as crystallization accelerators were used in a proportion illustrated in Table 1. These raw materials were mixed in a Henschel mixer, melt-kneaded in an extruder at a cylinder temperature of 170°–210° C. and pelletized. The pellets were injection molding machine JSW-75 (manufactured by Japan Steel Works Co.) at a cylinder temperature of 180°–200° C. a mold temperature of 100° C. and a mold cooling time of 30 seconds in Examples 1–3 and 5 or 80 seconds in Example 4. ASTM test specimens thus prepared were used for measuring physical properties. Results are illustrated in Table 1.

Examples 6–7

[Use of processability improver]

The lactic acid-based polymer B obtained in Preparation Example 2, nucleating agent, crystallization accelerator, and PSB obtained in Preparation Example 5 or PSB obtained in Preparation Example 6 as processability improver were used in proportions illustrated in Tables 1 and 2.

The raw materials were mixed in a Henschel mixer and pelletized and injection molded by the same procedures as Example 1 to obtain ASTM test specimens.

Cooling time in the molded could be reduced to 20 seconds.

Results are illustrated in Tables 1 and 2.

Example 8

[Use of dispersant and processability improver]

The lactic acid-based polymer B, dispersant, nucleating agent, crystallization accelerator and processability improver were mixed with a Henschel mixer in a proportion illustrated in Table 2, and pelletized and injection molded by the same procedures as described in Example 2 to obtain ASTM test specimens. Cooling time in the mold could be reduced to 20 seconds. Results are illustrated in Table 2.

Examples 9–11

[Kind of nucleating agent]

The lactic acid-based polymer B obtained in Preparation Example 2, dispersant, crystallization accelerator, and individually 3% by weight of kaolin JP-100 ($SiO_2$ content 80%, crystalline), silica ($SiO_2$ content 97%, crystalline) or kaolin clay ($SiO_2$ 80%, crystalline) were mixed and pelletized by carrying out the same procedures as Example 1 to obtain ASTM test specimens. Results are illustrated in Table 2. Nucleating agents were crystalline and had a $SiO_2$ content of 50% or more and thus molding ability and heat resistance of molded products were good.

Comparative Example 1

[Without dispersant and processability improver]

The dispersing agent was omitted, and the lactic acid-based polymer B obtained in Preparation Example 2, nucleating agent and crystallization accelerator were mixed with a Henschel mixer in a proportion illustrated in Table 3. The mixture was pelletized and injection molded by the same procedures as Example 1 to obtain ASTM test specimens. Results are illustrated in Table 3. Because of the absence of a dispersant PCL, dispersion of the nucleating agent was poor and local aggregation was observed. Impact strength was also low.

Comparative Example 2

[Outside ratio of L-lactic acid]

The lactic acid-based polymer A and C obtained respectively in Preparation Examples 1 and 3 were mixed with a dispersant to make an L-lactic acid ratio 60%. Thereafter a nucleating agent and crystallization accelerator were added in a proportion illustrated in Table 3, mixed with a Henschel mixer, and pelletized and injection molded to obtain ASTM test specimens. Results are illustrated in Table 3.

The polymer had an L-lactic acid ratio less than 75% by weight and thus molded specimens led to deformation in the stage of mold release even though the nucleating agent was added.

Comparative Example 3

[Without nucleating agent, processability improver and crystallization accelerator]

Pellets of lactic acid-based polymer B obtained in Preparation Example 2 were used. The pellets were injection molded at a cylinder temperature of 180°–200° C., mold temperature of 100° C. and mold cooling time of 80 seconds to obtain ASTM test specimens. Results are illustrated in Table 3.

Molded specimens were greatly deformed in the stage of mold release because the specimens were too soft due to absence of a nucleating agent.

Comparative Example 4

[Outside amount of nucleating agent]

Molded specimens were prepared by carrying out the same procedures as described in Example 2 except that the nucleating agent was used in an amount of 20 parts by weight which exceed the range of 0.1–15 parts by weight in the invention. Results are illustrated in Table 3.

Molded specimens had a low impact strength.

Comparative Example 5

[Outside amount of crystallization accelerator]

Molded specimens were prepared by carrying out the same procedures as described in Example 2 except that the crystallization accelerator was used in an amount of 11 parts by weight which exceed the range of 0.1–8 parts by weight in the invention. Results are illustrated in Table 3. Molded specimens had a low impact strength.

Comparative Example 6

[Outside amount of processability improver]

Molded specimens were prepared by carrying out the same procedures as described in Example 6 except that the processability improver was used in an amount of 30 parts by weight which exceed the range of 1~20 parts by weight in the invention. Results are illustrated in Table 3.

Molded specimens had poor dimensional accuracy and consistent product could not be obtained.

Comparative Examples 7~11

[Kind of nucleating agent]

Molded specimens were attempted to be prepared by carrying out the same procedures as described in Example 2 except that 3% by weight of the nucleating agent talc was individually replaced by 3% by weight of a crystalline nucleating agent having a SiO$_2$ content of less than 50% or an amorphous nucleating agent having a SiO$_2$ content of 50% or more. Nucleating agents used were herein UW (SiO$_2$ content 45%, crystalline), kaolinite (SiO$_2$ content 45%, crystalline), talc RF (SiO$_2$ content 40%, crystalline), synthetic silica (SiO$_2$ content 90%, amorphous) and silica (SiO$_2$ content 90%, amorphous). These formulations are illustrated in Table 4.

These molded specimens were too soft in the stage of molded release, led to large deformation and could not be used for measuring the physical properties.

[Effect of molding conditions]

Examples 12~13

Pellets were prepared by carrying out the same procedures as described in Example 2. The pellets were injection molded at a cylinder temperature of 180°~200° C. which is within the range of Example 2. Mold temperature was changed to 95° C. and 110° C. respectively, which are within the peak range of DSC lowering crystallization temperature. Other injection molding conditions were the same as Example 2. Results are illustrated in Table 5.

Comparative Examples 12~14

Pellets were prepared by carrying out the same procedures as described in Example 2. The pellets were injection molded at a cylinder temperature of 180°~200° C. which is within the range of Example 2.

Mold temperature was changed to a temperature outside the peak range of DSC lowering crystallization temperature. That is, mold temperature was set at 30° C. in Comparative Example 12, 130° C. in Comparative Example 13, and 80° C. in Comparative Example 14. Other injection molding conditions were the same as Example 2. Results are illustrated in Table 5.

Molded specimens obtained in Comparative Example 12 had poor heat resistance because of amorphous property. Molded specimens obtained in Comparative Examples 13 and 14 were too soft and led to large deformation in the stage of mold release because mold temperature was above Tg and the polymer was amorphous.

Comparative Example 15

ASTM test specimens were prepared by carrying out the same procedures as described in Example 1 except that the lactic acid-based polymer A was replaced by polypropylene resin and mold temperature was set at 30° C. Results are illustrated in Table 5.

The molded specimens had poor degradability in soil.

The foregoing examples are not intended to limit scope of the present invention. The invention may be practiced or embodied in still other ways without departing from the spirit or essential character thereof.

TABLE 1

| | | Example 1 | Example 2 | Example 3 | Example 4 | Example 5 | Example 6 |
|---|---|---|---|---|---|---|---|
| Polymer composition | Lactic acid-based polymer (wt %) | A 80 | B 90 | B 60 C 30 | D 95 | B 90 | B 100 |
| | Dispersant (wt %) | PCL 20 | PCL 10 | SB 10 | PCL 5 | PCL 10 | — |
| | L-lactic acid ratio (%) | 80 | 90 | 75 | 76 | 90 | 100 |
| | Amount (wt part) | 100 | 100 | 100 | 100 | 100 | 100 |
| Nucleating agent (wt part) | | talc 3 | talc 3 | talc 5 | talc 3 | talc 5 | talc 3 |
| Processability improver (wt part) | | — | — | — | — | — | PSB 10 |
| Crystallization accelerator (wt part) | | ATBC 1 | DIDA 1 | DIDA 1 | — | DIDA 3 | DIDA 1 |
| Processability | | excellent | excellent | excellent | good | excellent | very excellent |
| Heat resistance (°C.) | | 150 | 149 | 148 | 148 | 150 | 147 |
| Impact resistance (kg/cm$^2$) | | 12 | 9 | 7 | 8 | 9 | 9 |
| Degradability in soil | | after 3 months, readily broken by external force | | | | | |
| Weight loss (%) | | 35 | 28 | 15 | 29 | 29 | 27 |

TABLE 2

|  |  | Example 7 | Example 8 | Example 9 | Example 10 | Example 11 |
|---|---|---|---|---|---|---|
| Polymer composition | Lactic acid-based polymer (wt %) | B 100 | B 90 | B 100 | B 100 | B 100 |
|  | Dispersant (wt %) | — | PCL 10 | PCL 10 | PCL 10 | PCL 10 |
|  | L-lactic acid ratio (%) | 100 | 90 | 90 | 90 | 90 |
|  | Amount (wt part) | 100 | 100 | 100 | 100 | 100 |
| Nucleating agent (wt part) |  | talc 3 | talc 3 | kaolin JP100 3 | silica 3 | kaolin clay 3 |
| Processability improver (wt part) |  | PSE 5 | PSB 10 | — | — | — |
| Crystallization accelerator (wt part) |  | DIDA 1 | DIDA 1 | DIDA 1 | DIDA 1 | DIDA 1 |
| Processability |  | excellent | very excellent | excellent | excellent | excellent |
| Heat resistance (°C.) |  | 148 | 147 | 149 | 149 | 149 |
| Impact resistance (kg/cm$^2$) |  | 8 | 10 | 9 | 9 | 9 |
| Degradability in soil |  | after 3 months, readily broken by external force |  |  |  |  |
| Weight loss (%) |  | 23 | 32 | 27 | 28 | 28 |

TABLE 3

|  |  | Comparative Example 1 | Comparative Example 2 | Comparative Example 3 | Comparative Example 4 | Comparative Example 5 | Comparative Example 6 |
|---|---|---|---|---|---|---|---|
| Polymer composition | Lactic acid-based polymer (wt %) | B 100 | B 30 C 60 | B 90 | B 90 | B 90 | B 90 |
|  | Dispersant (wt %) | — | PCL 10 | PCL 10 | PCL 10 | PCL 10 | PCL 10 |
|  | L-lactic acid ratio (%) | 100 | 60 | 90 | 90 | 90 | 90 |
|  | Amount (wt part) | 100 | 100 | 100 | 100 | 100 | 100 |
| Nucleating agent (wt part) |  | talc 3 | talc 3 | — | talc 20 | talc 3 | talc 3 |
| Processability improver (wt part) |  | — | — | — | — | — | PSB 30 |
| Crystallization accelerator (wt part) |  | DIDA 1 | DIDA 1 | — | DIDA 1 | DIDA 11 | DIDA 1 |
| Processability |  | excellent | poor | poor | good | good | poor |
| Heat resistance (°C.) |  | 148 | 58 | 58 | 149 | 120 | — |
| Impact resistance (kg/cm$^2$) |  | 2 | — | — | 4 | 4 | 15 |
| Degradability in soil |  | after 3 months, readily broken by external force |  |  |  |  |  |
| Weight loss (%) |  | 10 | 28 | 28 | 31 | 30 | 35 |

TABLE 4

|  |  | Comparative Example 7 | Comparative Example 8 | Comparative Example 9 | Comparative Example 10 | Comparative Example 11 |
|---|---|---|---|---|---|---|
| Polymer composition | Lactic acid-based polymer (wt %) | B 90 | B 90 | B 90 | B 90 | B 90 |
|  | Dispersant (wt %) | PCL 10 | PCL 10 | PCL 10 | PCL 10 | PCL 10 |
|  | L-lactic acid ratio (%) | 90 | 90 | 90 | 90 | 90 |
|  | Amount (wt part) | 100 | 100 | 100 | 100 | 100 |
| Nucleating agent (wt part) |  | kaolin UW 3 | kaolinite 3 | talc RF 3 | synthetic silica 3 | silica 3 |
| Processability improver (wt part) |  | — | — | — | — | — |
| Crystallization accelerator (wt part) |  | DIDA 1 | DIDA 1 | DIDA 1 | DIDA 1 | DIDA 1 |
| Processability |  | poor | poor | poor | poor | poor |
| Heat resistance (°C.) |  | — | — | — | — | — |
| Impact resistance (kg/cm$^2$) |  | — | — | — | — | — |
| Degradability in soil |  | — | — | — | — | — |
| Weight loss (%) |  | — | — | — | — | — |

TABLE 5

|  |  | Example 12 | Example 13 | Comparative Example 12 | Comparative Example 13 | Comparative Example 14 | Comparative Example 15 |
|---|---|---|---|---|---|---|---|
| Polymer composition | Lactic acid based polymer (wt %) | B 90 | B 90 | B 90 | B 90 | B 90 | polypropylene resin |
|  | Dispersant (wt %) | PCL 10 | PCL 10 | PCL 10 | PCL 10 | PCL 10 |  |
|  | L-lactic acid ratio (%) | 90 | 90 | 90 | 90 | 90 |  |
|  | Amount (wt part) | 100 | 100 | 100 | 100 | 100 | 100 |
| Nucleating agent (wt part) |  | talc 3 | talc 3 | talc 3 | talc 3 | talc 3 | — |
| Processability improver (wt part) |  | — | — | — | — | — | — |
| Crystallization accelerator (wt part) |  | DIDA 1 | DIDA 1 | DIDA 1 | DIDA 1 | DIDA 1 | — |
| (°C.) |  | 95 | 110 | 30 | 130 | 80 | 30 |
| Processability |  | excellent | excellent | good | poor (deform) | poor (deform) | excellent |
| Heat resistance (°C.) |  | 150 | 149 | 57 | 58 | 58 | 151 |
| Impact resistance (kg/cm$^2$) |  | 8 | 8 | — | — | — | 12 |
| Degradability in soil |  | after 3 months, readily broken by external force | | | | | no change |
| Weight loss (%) |  | 28 | 28 | 30 | 29 | 31 | 0 |

What is claimed is:

1. A process for preparing a heat-resistant molded article of a lactic acid-based polymer comprising mixing 75~95% by weight of a lactic acid-based polymer with 5~25% by weight of poly-ε-caprolactone so as to obtain a L-lactic acid ratio of 75% by weight or more, adding 0.1~15 parts by weight of a crystalline inorganic powder comprising 50% by weight or more of SiO$_2$ as a nucleating agent to 100 parts by weight of said polymer mixture, melt-kneading the resultant composition, filling the same into a mold of a molding machine at a mold temperature of 85°~125° C., and forming a shape while promoting crystallization.

2. A process for preparing a heat-resistant molded article of a lactic acid-based polymer comprising mixing 100 parts by weight of a lactic acid-based polymer having a L-lactic acid ratio of 75% by weight or more, 0.1~15 parts by weight of a crystalline inorganic powder comprising 50% by weight or more of SiO$_2$ as a nucleating agent and 1~20 parts by weight of a polyester and is obtained by condensation of an aliphatic polyhydric alcohol with an aliphatic polybasic acid or with an aliphatic polybasic acid and a hydroxycarboxylic acid, melt-kneading the resultant composition, filling the same into a mold of a molding machine at a mold temperature of 85°~125° C., and forming a shape while promoting crystallization.

3. The process of claim 1 wherein 1~20 parts by weight of a polyester which has a weight average molecular weight of 80,000~300,000 and is obtained by condensation of an aliphatic polyhydric alcohol with an aliphatic polybasic acid or with an aliphatic polybasic acid and an hydroxycarboxylic acid is mixed with 100 parts by weight of the mixture of the lactic acid-based polymer and poly-ε-caprolactone.

4. The process of claim 1 wherein 0.1~8 parts by weight of an aliphatic dibasic acid ester, polyhydric alcohol ester or tributyl hydroxypolycarboxylate is added to 100 parts by weight of the mixture of the lactic acid-based polymer and poly-ε-caprolactone.

5. The process of claim 2 wherein 0.1~8 parts by weight of an aliphatic dibasic acid ester, polyhydric alcohol ester or tributyl hydroxypolycarboxylate is added to 100 parts by weight of the lactic acid-based polymer.

6. The process of claim 3 wherein 0.1~8 parts by weight of an aliphatic dibasic acid ester, polyhydric alcohol ester or tributyl hydroxypolycarboxylate is added to 100 parts by weight of the mixture of the lactic acid-based polymer and poly-ε-caprolactone.

7. A heat-resistant molded article of a lactic acid-based polymer having heat resistance of 100°~160° C. comprising 100 parts by weight of a polymer mixture comprising 75~95% by weight of a lactic acid-based polymer and 5~25% by weight of poly-ε-caprolactone and having a L-lactic acid ratio of 75% by weight or more and 0.1~15 parts by weight of a crystalline inorganic powder comprising 50% by weight or more of $SiO_2$ as a nucleating agent.

8. A lactic acid-based polymer composition comprising 100 parts by weight of a lactic acid-based polymer having an L-lactic acid ratio of 75% by weight or more, 0.1~15 parts by weight of a crystalline inorganic powder comprising 50% by weight or more of $SiO_2$ as a nucleating agent, and 1~20 parts by weight of a polyester obtained by condensation of an aliphatic polyhydric alcohol with an aliphatic polybasic acid or with an aliphatic polybasic acid and a hydroxycarboxylic acid.

9. A heat-resistant molded article which has heat resistance of 100°~160° C. and is obtained by molding the lactic acid-based polymer composition of claim 8.

10. A lactic acid-based polymer composition comprising 100 parts by weight of a polymer mixture comprising of 75~95% by weight of a lactic acid-based polymer and 5~25% by weight of poly-ε-caprolactone and having a L-lactic acid ratio of 75% by weight or more, 0.1~15 parts by weight of a crystalline inorganic powder comprising 50% by weight or more of $SiO_2$ as a nucleating agent and 1~20 parts by weight of a polyester obtained by condensation of an aliphatic polyhydric alcohol with an aliphatic polybasic acid or with an aliphatic polybasic acid and hydroxycarboxylic acid.

11. A heat-resistant molded article of the lactic acid-based polymer, which has heat resistance of 100°~160° C. and is obtained by molding the lactic acid-based polymer composition of claim 10.

* * * * *